United States Patent
Kitano et al.

(10) Patent No.: US 6,943,219 B2
(45) Date of Patent: Sep. 13, 2005

(54) POLYMER AND EPOXY RESIN COMPOSITIONS

(75) Inventors: Kenichi Kitano, Kobe (JP); Yoshiki Nakagawa, Kobe (JP); Masayuki Fujita, Kobe (JP)

(73) Assignee: Kaneka Corporation, Osaka (JP)

( * ) Notice: Subject to any disclaimer, the term of this patent is extended or adjusted under 35 U.S.C. 154(b) by 213 days.

(21) Appl. No.: 10/370,727

(22) Filed: Feb. 24, 2003

(65) Prior Publication Data

US 2003/0130437 A1 Jul. 10, 2003

Related U.S. Application Data

(62) Division of application No. 09/763,150, filed as application No. PCT/JP99/04471 on Aug. 20, 1999, now Pat. No. 6,555,622.

(30) Foreign Application Priority Data

Aug. 20, 1998 (JP) .......................................... 10/234430
Aug. 20, 1998 (JP) .......................................... 10/234431
Sep. 14, 1998 (JP) .......................................... 10/260195

(51) Int. Cl.$^7$ ................................................. C08F 8/08
(52) U.S. Cl. ................... 525/330.3; 525/109; 525/113; 525/114; 525/115; 525/117; 525/326.2; 525/326.5; 525/326.8; 525/327.3; 525/327.4; 525/327.6; 525/328.8; 525/329.1; 525/329.2; 525/329.3; 525/329.4; 525/329.5; 525/330.4; 525/330.5; 525/331.5; 525/331.9; 525/332.4; 525/333.3; 525/333.5; 525/333.6; 525/333.7; 525/333.9
(58) Field of Search .............................. 525/330.3, 109, 525/113, 114, 115, 117, 326.2, 326.5, 326.8, 327.3, 327.4, 327.6, 328.8, 329.1, 329.2, 329.3, 329.4, 329.5, 330.4, 330.5, 331.5, 331.9, 332.4, 333.3, 333.5, 333.6, 333.7, 333.9

(56) References Cited

U.S. PATENT DOCUMENTS

| | | | |
|---|---|---|---|
| 3,786,116 A | 1/1974 | Milkovich et al. | |
| 3,846,393 A | 11/1974 | Milkovich et al. | |
| 4,567,239 A | 1/1986 | Mancinelli | 525/309 |
| 4,940,761 A | * 7/1990 | Spinelli et al. | 526/273 |
| 5,266,644 A | 11/1993 | Riffle et al. | 525/286 |
| 5,382,634 A | * 1/1995 | Koyama et al. | 525/286 |
| 5,391,663 A | 2/1995 | Bening et al. | 526/178 |
| 5,719,246 A | 2/1998 | Taniguchi et al. | 526/320 |
| 5,763,548 A | 6/1998 | Matyjaszewski et al. | 526/135 |
| 5,789,487 A | 8/1998 | Matyjaszewski et al. | 526/172 |
| 5,807,937 A | 9/1998 | Matyjaszewski et al. | 526/135 |
| 5,852,129 A | 12/1998 | Kusakabe et al. | 525/330.3 |
| 5,900,464 A | 5/1999 | Letchford et al. | 525/94 |
| 6,103,846 A | 8/2000 | Willis et al. | 526/335 |

FOREIGN PATENT DOCUMENTS

| | | | |
|---|---|---|---|
| EP | 0789036 A2 | 2/1997 | |
| EP | 0816385 A1 | 6/1997 | |
| JP | 247455 A | 7/1987 | |
| JP | 05-097912 | 4/1993 | |
| JP | 05097912 A | * 4/1993 | C08F/4/36 |
| WO | WO-96/30421 | 10/1996 | |
| WO | WO-97/18247 | 5/1997 | |
| WO | WO-98/01480 | 1/1998 | |
| WO | WO-98/40415 | 9/1998 | |

* cited by examiner

*Primary Examiner*—Robert Sellers
(74) *Attorney, Agent, or Firm*—Connolly, Bove, Lodge & Hutz, LLP

(57) ABSTRACT

The present invention provides a vinyl polymer with an epoxy group terminally introduced therein and an epoxy resin composition comprising (A) an epoxy resin and (B) a vinyl polymer which has a main chain produced by living radical polymerization and has a reactive functional group at a main chain terminus. A flexible epoxy resin composition can be obtained using these compounds. The invention further provides an epoxy resin composition having an epoxy group at a main chain terminus thereof.

22 Claims, No Drawings

POLYMER AND EPOXY RESIN COMPOSITIONS

CROSS REFERENCE APPLICATION

This present application is a Divisional of application Ser. No. 09/763,150 filed Apr. 20, 2001 now U.S. Pat. No. 6,555,622; which is National Phase of PCT/JP99/04471 filed Aug. 20, 1999.

TECHNICAL FIELD

The present invention relates to an epoxy resin composition. More particularly, it relates to an epoxy-terminated vinyl polymer, a composition comprising the polymer and a flexible composition comprising an epoxy resin and a reactive functional group-containing vinyl polymer.

BACKGROUND ART

When combined with a curing agent, epoxy resins give cured products having a three-dimensionally crosslinked structure and thus exhibiting various desirable characteristics. Crosslinked epoxy groups are exploited in a wide range of applications, such as paints, electrics/electronics, civil engineering/building, adhesives, and composite materials, owing to excellence in the balance between heat resistance and mechanical/physical properties and in electrical characteristics, adhesive characteristics and corrosion resistance, among others, and to the ease of molding.

On the other hand, epoxy resins are generally hard and brittle by nature and may form cracks upon exposure to stress strain or thermal shock on the occasion of curing or in use, hence epoxy resins are required to be rendered tenacious and flexible. In the field of IC sealing, for instance, where packages are becoming smaller and thinner, improvement in crack resistance is needed.

As a means for providing epoxy resins with flexibility, there may be mentioned the combined use of a flexible epoxy resin. The flexible epoxy resin includes, among others, diglycidyl esters of long-chain fatty acids such as linoleic acid dimer; polyglycidyl ethers of polyhydric alcohols such as glycerol, pentaerythritol and trimethylolpropane; diglycidyl ethers of polyalkylene glycols such as polyethylene glycol; and the like. However, long-chain fatty acid glycidyl esters are short of alkali resistance and gasoline resistance, although they are excellent in flexibility. Polyalkylene glycol glycidyl ethers also have problems, for example they are inferior in weathering resistance.

It is known that crosslinking functional group-terminated liquid oligomers, when used alone or combined with an appropriate curing agent, give cured products excellent in rubber elasticity. Thus, it is expected that an epoxy-terminated vinyl polymer, if successfully obtained in a simple and easy manner, might serve as a novel flexible epoxy resin excellent in flexibility. Further, vinyl polymers show various characteristics depending on the main chain skeleton thereof and, therefore, are amenable to molecular design according to the use/purpose thereof.

As for the production of epoxy-terminated vinyl polymers, U.S. Pat. No. 4,429,099, for instance, discloses a method which comprises reacting the termini of polyisobutylene with a phenol in the manner of Friedel-Crafts reaction and further utilizing the reactivity of the phenol group to synthesize an epoxy-terminated polyisobutylene. However, low-polarity polymers such as polyisobutylene are poor in compatibility with epoxy resins and, if well dispersed, give a high viscosity.

In view of the above state of the art, it is an object of the present invention to provide a vinyl polymer with an epoxy group terminally introduced therein and an epoxy resin composition in which such polymer is used.

A further object of the invention is to provide an epoxy resin composition having flexibility by adding a vinyl polymer having a terminal reactive functional group to an epoxy resin.

SUMMARY OF THE INVENTION

Thus, according to a first aspect thereof, the invention provides an epoxy resin composition which comprises a vinyl polymer having a group represented by the following general formula (1) at a main chain terminus as well as a vinyl polymer having a group represented by the following general formula (1) at a main chain terminus.

(1)

In the above formula, $R^1$, $R^2$ and $R^3$ are the same or different and each represents a hydrogen atom, a monovalent hydrocarbon group containing 1 to 10 carbon atoms or a monovalent group containing 1 to 10 carbon atoms as derived from two hydrocarbon groups by being bound together via an ether bond or ester bond, and $R^1$ and $R^2$ or $R^2$ and $R^3$ may be combined together at respective other termini to form a cyclic structure.

In accordance with a second aspect, the invention provides an epoxy resin composition which comprises (A) an epoxy resin and (B) a vinyl polymer having a main chain produced by living radical polymerization and a reactive functional group at a main chain terminus.

In the following, the present invention is described in detail.

DETAILED DISCLOSURE OF THE INVENTION

The first aspect of the invention lies in an epoxy resin composition comprising a vinyl polymer terminally having a group represented by the general formula (1) shown above, namely an epoxy-terminated vinyl polymer.

In the general formula (1), $R^1$, $R^2$ and $R^3$ are the same or different and each represents a hydrogen atom, a monovalent hydrocarbon group containing 1 to 10 carbon atoms or a monovalent group containing 1 to 10 carbon atoms as derived from two hydrocarbon groups by being bound together via an ether bond or ester bond, and $R^1$ and $R^2$ or $R^2$ and $R^3$ may be combined together at respective other termini to form a cyclic structure.

The monomer constituting the main chain of the above vinyl polymer is not particularly restricted but maybe any of various monomers. As examples, there may be mentioned (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth) acrylate, toluyl (meth)acrylate, benzyl (meth)acrylate, 2-methoxyethyl (meth)acrylate, 3-methoxybutyl (meth) acrylate, 2-hydroxyethyl (meth)acrylate, 2-hydroxypropyl (meth)acrylate, stearyl (meth)acrylate, glycidyl (meth) acrylate, 2-aminoethyl (meth)acrylate, γ-(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth) acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (methl)acrylate; styrenic monomers such as styrene, vinyltoluene, α-methylstyrene, chlorostyrene, and styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid and monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality of them may be copolymerized. Preferred among them from the viewpoint of physical properties of products, among others, are styrenic monomers and (meth)acrylic monomers, more preferably (meth)acrylic ester monomers, still more preferably acrylic ester monomers, and butyl acrylate is most preferred. In the practice of the invention, these preferred monomers may be copolymerized with another monomer or other monomers and, on that occasion, the content of these preferred monomers is preferably 40% by weight.

The molecular weight distribution of the above vinyl polymer is not particularly restricted but the ratio (Mw/Mn) of weight average molecular weight (Mw) to number average molecular weight (Mn) as determined by gel permeation chromatography is generally less than 1.8, preferably not more than 1.7, more preferably not more than 1.6, still more preferably not more than 1.5, especially preferably not more than 1.4, most preferably not more than 1.3. In GPC measurements in the practice of the invention, the measurements are generally carried out using polystyrene gel columns with chloroform as the mobile phase. The number average molecular weight and so on can be determined on the polystyrene equivalent basis.

The number average molecular weight of the above vinyl polymer is not particularly restricted but preferably is within the range of 500 to 1,000,000, more preferably 1,000 to 100,000.

The vinyl polymer having a terminal structure represented by the general formula (1) can be obtained by reacting the reactive functional group of a reactive functional group-terminated vinyl polymer with a compound represented by the general formula (2) given below. The reactive functional group is not particularly restricted but preferably is an alcoholic hydroxyl group, a phenolic hydroxyl group, an amino group or a carboxyl group.

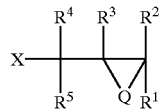

(2)

In the general formula (2), $R^1$, $R^2$ and $R^3$ are as defined above. $R^4$ and $R^5$ are the same or different and each represents a hydrogen atom, a monovalent hydrocarbon group containing 1 to 10 carbon atoms or a monovalent group containing 1 to 10 carbon atoms as derived from two hydrocarbon groups by being bound together via an ether bond or ester bond. X represents a chlorine, bromine or iodine atom.

In the first aspect of the invention, the reactive functional group-terminated vinyl polymer is produced by the following steps:
(1) Polymerizing a vinyl monomer(s) by the technique of living radical polymerization and
(2) Reacting, at the end point of the polymerization, the polymer with a compound having both a reactive function group and an ethylenically unsaturated group.

Thus, radical polymerization of a vinyl monomer(s) is carried out in the manner of living radical polymerization, typically atom transfer radical polymerization, followed by causing the species active in polymerization, namely the polymer radical, to add to the ethylenically active group of the compound having both ethylenically unsaturated group and a reactive functional group as well, whereupon a reactive functional group-terminated vinyl polymer can be obtained.

While "living polymerization", in its narrow sense, means the polymerization in which molecular chains grow while the terminal activity thereof is always maintained, it generally includes pseudo-living polymerization in which molecular chains grow while terminally inactivated species and terminally active species are in equilibrium. It is the latter definition that applies in the present invention. In recent years, "living radical polymerization" has been actively studied by a number of groups. As examples, there may be mentioned, among others, the technique using such a radical capping agent as a cobalt-porphyrin complex (J. Am. Chem. Soc., 1994, 116, 7943) or a nitroxide compound (Macromolecules, 1994, 27, 7228) and the atom transfer radical polymerization (ATRP) technique using an organic halide or the like as an initiator and a transition metal complex as a catalyst. In spite of the fact that it belongs to the class of radical polymerization in which the rate of polymerization is high and a termination reaction such as mutual coupling of radicals readily occurs and which is said to be difficult to control, living radical polymerization is hardly subject to such termination reaction and can give a polymer with a narrow molecular weight distribution (Mw/Mn=1.1 to 1.8) and renders it possible to control the molecular weight arbitrarily by selecting the monomer/initiator charge ratio.

Further, "living radical polymerization" is characterized by nature in that the structures of the polymer termini are distinct and terminal functional group introduction is easy and, therefore, it is preferred as the method of producing a vinyl polymer terminally having a specific functional group. Among living radical polymerization techniques, the atom transfer radical polymerization technique is most preferred because of the ease of molecular weight and molecular weight distribution control.

Atom transfer radical polymerization is characterized in that a vinyl monomer(s) is(are) polymerized using an organic halide (e.g. a compound having a halogen atom at the α position, or a compound having a halogen atom at the benzyl position) or a halogenated sulfonyl compound as the initiator and a transition metal complex as the catalyst.

The above organic halide or halogenated sulfonyl compound contains a carbon atom bound to a halogen atom and further bound to a carbonyl, phenyl or sulfonyl group, so that the carbon-halogen bond can be readily activated and can function as an initiator. Among typical examples of such compound, there are the following: $C_6H_5$—$CH_2X$, $C_6H_5$—$C(H)(X)CH_3$, $C_6H_5$—$C(X)(CH_3)_2$ (where $C_6H_5$ represents a phenyl group and X represents a chlorine, bromine or iodine atom); $R^8$—$C(H)(X)$—$CO_2R^9$, $R^8$—$C(CH_3)(X)$—$CO_2R^9$, $R^8$—$C(H)(X)$—$C(O)R^9$, $R^8$—$C(CH_3)(X)$—$C(O)R^9$ (where $R^8$ and $R^9$ are the same or different and each represents a hydrogen atom, an alkyl group containing 1 to 20 carbon atoms, an aryl group containing 6 to 20 carbon atoms or an aralkyl group containing 7 to 20 carbon atoms and X represents a chlorine, bromine or iodine atom); $R^8$—$C_6H_4$—$SO_2X$ (where $R^8$ represents a hydrogen atom, an alkyl group containing 1 to 20 carbon atoms, an aryl group containing 6 to 20 carbon atoms or an aralkyl group containing 7 to 20 carbon atoms and X represents a chlorine, bromine or iodine atom); and the like. By converting the terminal halogen of a polymer obtained by using this initiator by the method mentioned later herein, a vinyl polymer having a group represented by the general formula (1) at one terminus is produced.

An organic halide or halogenated sulfonyl compound having a functional group other than the functional group serving to initiate the polymerization may also be used. In that case, a polymer is produced which has the functional group bound to the initiator at one terminus of the main chain and the halogen group at the other terminus. As the functional group, there may be mentioned alkenyl, crosslinking silyl, hydroxyl, epoxy, amino, amido and carboxyl groups, among others. When the terminal halogen atom of the polymer is converted to a substituent having a group of the general formula (1), a vinyl polymer having, at both termini, functional groups which are the same or different. By coupling the terminal halogens together, it is possible to produce a vinyl polymer which has functional groups at both termini.

The polymerization may also be carried out by using an organic halide or halogenated sulfonyl compound having two or more initiation sites as the initiator. In such case, a vinyl polymer having two or more halogen groups in each molecule is produced. When the termini of this polymer are converted by the method mentioned later herein, a vinyl polymer having two or more groups represented by the general formula (1) per molecule is obtained. By carrying out the polymerization using an initiator having two initiation sites and converting the both termini of the polymer by the method mentioned later herein, a vinyl polymer having a group of the general formula (1) at both termini is produced.

Specific examples of the initiator having two initiation sites are as follows:

a, m, p-  X—$CH_2$—$C_6H_4$—$CH_2$—X  (i-1)

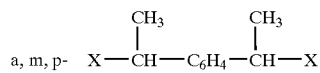
(i-2)

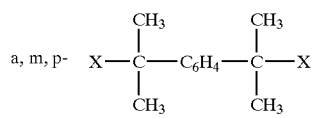
(i-3)

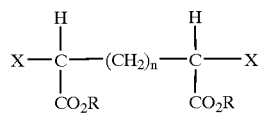
(i-4)

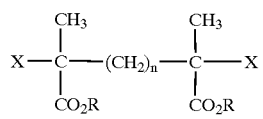
(i-5)

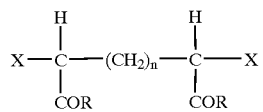
(i-6)

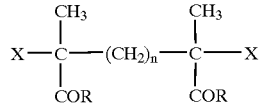
(i-7)

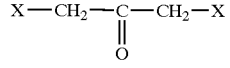
(i-8)

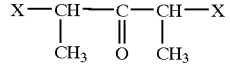
(i-9)

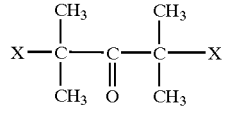
(i-10)

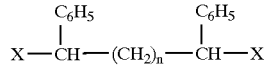
(i-11)

(In the above formulas, $C_6H_4$ represents a phenylene group, X represents a chlorine, bromine or iodine atom, R represents an alkyl group containing 1 to 20 carbon atoms, an aryl group containing 6 to 20 carbon atoms or an aralkyl group containing 7 to 20 carbon atoms and n represents an integer of 0 to 20);

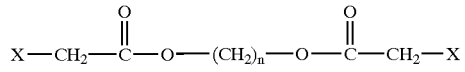
(i-12)

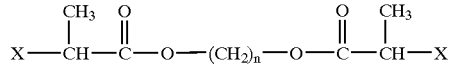
(i-13)

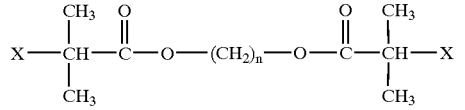
(i-14)

-continued

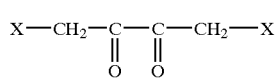 (i-15)

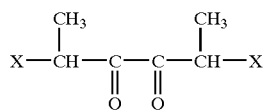 (i-16)

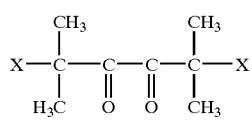 (i-17)

o, m, p-   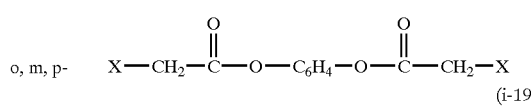 (i-18)

a, m, p-   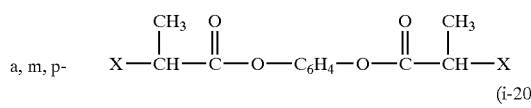 (i-19)

a, m, p-   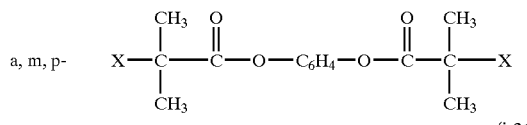 (i-20)

a, m, p-   X—SO$_2$—C$_6$H$_4$—SO$_2$—X (i-21)

(In the above formulas, X represents a chlorine, bromine or iodine atom, n represents an integer of 0 to 20 and C$_6$H$_4$ represents a phenylene group); and the like.

Living radical polymerization can be carried out in the absence of or in any of various organic solvents. As the solvents, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; and so on. These may be used singly or two or more of them may be used in admixture. It is also possible to carry out the polymerization in an emulsion system or in a system in which the supercritical fluid CO$_2$ is used as a medium. The above polymerization can be effected within the temperature range of 0 to 200° C., preferably within the range of room temperature to 150° C.

The transition metal complex to be used as the catalyst is not particularly restricted but includes, as preferred species, complexes of zero-valence copper, univalent copper, bivalent ruthenium, bivalent iron or bivalent nickel. Among them, copper complexes are preferred. As specific examples of the univalent copper compound, there may be mentioned cuprous chloride, cuprous bromide, cuprous iodide, cuprous cyanide, cuprous oxide and cuprous perchlorate. When a copper compound is used, a ligand, for example 2,2'-bipyridyl or a derivative thereof, 1,10-phenanthroline or a derivative thereof, or a polyamine such as tetramethylethylenediamine, pentamethyldiethylenetriamine or hexamethyltris(2-aminoethyl)amine, is added for increasing the catalytic activity. The tristriphenylphosphine complex of bivalent ruthenium chloride (RuCl$_2$(PPh$_3$)$_3$) is also suited for use as a catalyst. When a ruthenium compound is used as a catalyst, an aluminum alkoxide is added as an activator. Further, the bistriphenylphosphine complex of bivalent iron (FeCl$_2$(PPh$_3$)$_2$), the bistriphenylphosphine complex of bivalent nickel (NiCl$_2$(PPh$_3$)$_2$) and the bistributylphosphine complex of bivalent nickel (NiBr$_2$(PBu$_3$)$_2$) are also suited as catalysts.

The compound having both an ethylenically unsaturated group and a reactive functional group is not particularly restricted but includes, among others, hydroxy-containing vinyl monomers such as 2-hydroxyethyl (meth)acrylate and 2-hydroxypropyl (meth)acrylate; amido-containing vinyl monomers such as (meth)acrylamide; amino-containing vinyl monomers such as 2-aminoethyl (meth)acrylate; carboxyl-containing vinyl monomers such as (meth)acrylic acid, maleic acid, maleic acid monoalkyl esters, fumaric acid and fumaric acid monoalkyl esters, and the like.

Further, maleic anhydride; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; tert-butoxystyrene; acetoxystyrene; and the like may also be used.

Further, phenols having an ethylenically unsaturated group, such as o-, m- and p-allylphenol and o-, m- and p-allyloxyphenol; alcohols having an ethylenically unsaturated group, such as allyl alcohol, butenyl alcohol, pentenyl alcohol and hexenyl alcohol; amines having an ethylenically unsaturated group, such as allylamine, butenylamine, pentenylamine and hexenylamine; carboxylic acid compounds having an ethylenically unsaturated group, such as vinyl acetate, pentenoic acid, heptenoic acid and undecenoic acid; and the like may also be used.

When the above compound having both an ethylenically unsaturated group and a reactive functional group is reacted with the polymer terminus, the compound as such may be subjected to reaction. In some cases, however, the reactive functional group may affect the polymer terminus and, in such cases, it may be used in the form having a protective group. As the protective group, there may be mentioned acetyl, silyl groups and alkoxy groups, among others. Suited for use as the compound having a protective functional group are all the compounds mentioned above whose functional group is protected.

The above compound having both a reactive functional group and an ethylenically unsaturated group may be subjected to reaction with the polymer isolated after completion of the vinyl monomer polymerization by adding to that polymer together with a catalyst or may be added and subjected to reaction in the course of polymerization (in situ). In the latter case, the monomer conversion of the first polymerization should be as high as possible, preferably not less than 80%. If the conversion is not more than 80%, the crosslinking silyl group is distributed on side chains, not at molecular termini, whereby the mechanical characteristics of cured products will be impaired. In principle, the addition of such compound having a polymerizable alkenyl group and a crosslinking silyl group in an equivalent amount relative to the whole number of termini results in introduction of the functional group at all termini. For securing the introduction of the functional group at all termini, however, it is recommendable to use the compound in excess, specifically in an amount of 1 to 5 times excess relative to the number of termini. When it is used in an amount not less than 5 times, the functional group is introduced terminally into the polymer at an excessively high density and this is unfavorable from the cured product physical properties viewpoint.

In the first aspect of the invention, the vinyl polymer having a reactive functional group is also produced by the following steps:

(1) Producing a vinyl polymer having a terminal structure represented by the following general formula 3 (a vinyl polymer having a halogen atom at a main chain terminus) by subjecting vinyl monomers to atom transfer radical polymerization, namely radical polymerization using an organic halide or halogenated sulfonyl compound as an initiator and a transition metal complex as a catalyst:

  (3)

wherein $R^6$ and $R^7$ each represents a group bound to the ethylenically unsaturated group and X represents a chlorine, bromine or iodine atom) and (2) Converting the halogen atom in general formula (3) to a substituent having a reactive functional group.

The initiators, catalysts, solvents, polymerization conditions and so forth as already mentioned hereinabove specifically for atom transfer radical polymerization all can adequately be used.

As the method of converting the halogen at a polymer terminus, there maybe mentioned, for example, the nucleophilic substitution reaction using a nucleophilic reagent having a reactive functional group. As such nucleophilic reagent, there may be mentioned, among others, alcohol compounds, phenol compounds, carboxylic compounds, amine compounds and amide compounds each having a reactive functional group, and alkali metal salts or ammonium salts thereof. Carbanions having a reactive functional group and stabilized by an electron-attracting substituent are also suited for use. Specific examples of the nucleophilic reagent are shown below.

As the alcohols having a reactive function group, there maybe mentioned, among others, aliphatic diols such as ethylene glycol; alicyclic diols such as 1,2-cyclopentanediol, 1,3-cyclopentanediol, 1,2-cyclohexanediol, 1,3-cyclohexanediol and 1,4-cyclohexanediol; amino-containing alcohols such as ethanolamine; and the like.

As the phenols having a reactive function group, there may be mentioned, among others, compounds having two phenolic hydroxyl groups in each molecule, such as hydroquinone, catechol, resorcinol, bisphenol A and biphenol; and the like.

As the carboxylic acids having a reactive function group, there may be mentioned, among others, hydroxyl-containing carboxylic acid compounds such as HO—(CH$_2$)$_n$—CO$_2$H (n being an integer of 0 to 10); carboxylic acid compounds having a phenolic hydroxyl group, such as hydroxybenzoic acid and 4'-hydroxy-4-biphenylcarboxylic acid; amino acid compounds; dibasic carboxylic acids such as oxalic acid, malonic acid, succinic acid, glutaric acid, adipic acid, HO$_2$C—(CH$_2$)$_n$—CO$_2$H (n being an integer of 5 to 20), 1,2-cyclopentanedicarboxylic acid, 1,2-cyclohexanedicarboxylic acid, 1,3-cyclohexanedicarboxylic acid, 1,4-cyclohexanedicarboxylic acid, maleic acid, fumaric acid, malic acid, tartaric acid, phthalic acid, isophthalic acid, terephthalic acid and naphthalenedicarboxylic acids; halides of the dibasic carboxylic acids mentioned above; cyclic acid anhydrides such as succinic anhydride, maleic anhydride and phthalic anhydride; and the like.

As the amines having a reactive function group, there may be mentioned, among others, hydroxyl-containing amines such as ethanolamine; diamine compounds such as ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-nonanediamine, 1,10-decanediamine, 1,12-dodecanediamine, 4,4'-methylenebis(cyclohexylamine), 1,2-diaminocyclohexane, 1,3-diaminocyclohexane, 1,4-diaminocyclohexane, 1,2-phenylenediamine, 1,3-phenylenediamine, 1,4-phenylenediamine and α,α'-diamino-p-xylene; and the like.

Alkali metal salts and ammonium salts of the above-mentioned various nucleophilic reagents may also be used as nucleophilic reagents. The alkali metal salts and ammonium salts are obtained by reacting the above nucleophilic reagents with a basic compound. The basic compound is not particularly restricted but, for preparing alkali metal salts, for instance, use is made of alkali metals such as potassium, sodium and lithium; metal alkoxides such as sodium methoxide, potassium methoxide, lithium methoxide, sodium ethoxide, potassium ethoxide, lithium ethoxide, sodium tert-butoxide and potassium tert-butoxide; carbonates such as sodium carbonate, potassium carbonate, lithium carbonate and sodium hydrogen carbonate; hydroxides such as sodium hydroxide and potassium hydroxide; hydrides such as sodium hydride and potassium hydride; organolithium compounds such as methyllithium, ethyllithium, n-butyllithium, tert-butyllithium, lithium diisopropylamide and lithium hexamethyldisilazide; and like bases. In preparing ammonium salts, use is made of, for example, ammonium, amines such as trimethylamine, triethylamine, tributylamine, tetramethylethylenediamine and pentamethyl-diethylenetriamine; pyridine compounds such as pyridine and picoline; and like nitrogen bases.

Quaternary ammonium salts may also be used as the nucleophilic reagent. The quaternary ammonium salts can be prepared by reacting the alkali metal salts mentioned above with a quaternary ammonium halide. The quaternary ammonium halide is not particularly restricted but includes, among others, tetramethylammonium halides, tetraethylammonium halides, trimethylbenzylammonium halides, trimethyldodecylammonium halides and tetrabutylammonium halides.

As the solvent to be used in the nucleophilic substitution reaction, there may be mentioned, among others, hydrocarbon solvents such as benzene, toluene and xylene; halogenated hydrocarbon solvents such as methylene chloride, chloroform and chlorobenzene; ether solvents such as diethyl ether, dioxane, tetrahydrofuran, diphenyl ether, anisole and dimethoxybenzene; ester solvents such as ethyl acetate and butyl acetate; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; amide solvents such as dimethylformamide, dimethylacetamide and hexamethylphosphoric triamide; sulfoxide solvents such as dimethyl sulfoxide; carbonate solvents such as ethylene carbonate and propylene carbonate; water and so on. These may be used singly or two or more of them may be used in admixture. The substitution reaction can be carried out at 0 to 150° C.

For promoting the substitution reaction, a basic compound may be added to the reaction system. All the bases already specifically mentioned hereinabove may adequately be used as the base.

A phase transfer catalyst such as a quaternary ammonium halide and crown ether may also be added to the reaction system for promoting the substitution reaction. Those already specifically mentioned hereinabove may be used as the quaternary ammonium halide.

As already mentioned hereinabove, a vinyl polymer having a functional group at both termini can be produced also by polymerizing vinyl monomers using an initiator having a reactive functional group, followed by coupling of a polymer terminus with another. As the method of coupling, there may be mentioned, for example, a method which comprises coupling terminal halogens with each other using a compound having a total of two or more functional groups which may be the same or different and each can substitute the terminal halogen in the general formula 3.

The compound having a total of two or more functional groups each capable of substituting the terminal halogen atom is not particularly restricted but preferably is a polyol, polyamine, polycarboxylic acid or polythiol, or a salt thereof, an alkali metal sulfide or the like. Specific examples of these compounds are as follows:

Polyols such as ethylene glycol, 1,2-propanediol, 1,3-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,5-pentanediol, 1,4-pentanediol, 2,4-pentanediol, 1,6-hexanediol, 1,7-heptanediol, 1,8-octanediol, 1,9-nonanediol, 1,10-decanediol, 1,12-dodecanediol, 1,2-cyclopentanediol, 1,3-cyclopentanediol, 1,2-cyclohexanediol, 1,3-cyclohexanediol, 1,4-cyclohexanediol, glycerol, 1,2,4-butanetriol, catechol, resorcinol, hydroquinone, 1,2-dihydroxynaphthalene, 1,3-dihydroxynaphthalene, 1,5-dihydroxynaphthalene, 2,6-dihydroxynaphthalene, 2,2'-biphenol, 4,4'-biphenol, bis(4-hydroxyphenyl)methane, 4,4'-isopropylidenephenol, 3,3'-(ethylenedioxy)diphenol, $\alpha,\alpha'$-dihydroxy-p-xylene, 1,1,1-tris(4-hydroxyphenyl)ethane, pyrogallol and 1,2,4-benzenetriol; and alkali metal salts of the above polyol compounds;

Polyamines such as ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-diaminononane, 1,10-diaminodecane, 1,12-diaminododecane, 4,4'-methylenebis(cyclohexylamine), 1,2-diaminocyclohexane, 1,3-diaminocyclohexane, 1,4-diaminocyclohexane, 1,2-phenylenediamine, 1,3-phenylenediamine, 1,4-phenylenediamine and $\alpha,\alpha'$-diamino-p-xylene; and alkali metal salts of the above polyamines;

Polycarboxylic acids such as oxalic acid, malonic acid, methylmalonic acid, dimethylmalonic acid, succinic acid, methylsuccinic acid, glutaric acid, adipic acid, 1,7-heptanedicarboxylic acid, 1,8-octanedicarboxylic acid, 1,9-nonanedicarboxylic acid, 1,10-decanedicarboxylic acid, 1,11-undecanedicarboxylic acid, 1,12-dodecanedicarboxylic acid, 1,2-cyclopentanedicarboxylic acid, 1,2-cyclohexanedicarboxylic acid, 1,3-cyclohexanedicarboxylic acid, 1,4-cyclohexanedicarboxylic acid, 1,3,5-cyclohexanetricarboxylic acid, phthalic acid, isophthalic acid, terephthalic acid, 1,2,3-benzenetricarboxylic acid and 1,2,4,5-benzenetetracarboxylic acid; and alkali metal salts of the above polycarboxylic acids;

Polythiols such as 1,2-ethanedithiol, 1,3-propanedithiol, 1,4-butanedithiol, 2,3-butanedithiol, 1,5-pentanedithiol, 1,6-hexanedithiol, 1,7-heptanedithiol, 1,8-octanedithiol, 1,9-nonanedithiol, 2-mercaptoethyl ether, p-xylene-$\alpha,\alpha'$-dithiol, 1,2-benzenedithiol, 1,3-benzenedithiol and 1,4-benzenedithiol; and alkali metal salts of the above polythiol compounds;

Lithium sulfide, sodium sulfide and potassium sulfide; and so forth.

For promoting the substitution reaction, a basic compound or a quaternary ammonium salt may also be added. As specific examples thereof, those already specifically mentioned hereinabove may be mentioned.

The vinyl polymer having a reactive functional group at a main chain terminus according to the first aspect of the invention can also be produced by radical polymerization of a vinyl monomer(s) using a chain transfer agent having a reactive function group(s).

The reactive functional group-terminated vinyl polymer obtained in the above manner, when reacted with a compound represented by the general formula (2), gives a vinyl polymer terminally having a group represented by the general formula (1). The reactive functional group-terminated vinyl polymer is produced by the method already mentioned.

The compound represented by the general formula (2) is not particularly restricted but epichlorohydrin and epibromohydrin are preferred because of ready availability.

As the solvent to be used in carrying out the reaction, there maybe mentioned, among others, hydrocarbon solvents such as benzene, toluene and xylene; halogenated hydrocarbon solvents such as methylene chloride, chloroform and chlorobenzene; ether solvents such as diethyl ether, dioxane, tetrahydrofuran, diphenyl ether, anisole and dimethoxybenzene; ester solvents such as ethyl acetate and butyl acetate; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; amide solvents such as dimethylformamide, dimethylacetamide and hexamethylphosphoric triamide; sulfoxide solvents such as dimethyl sulfoxide; carbonate solvents such as ethylene carbonate and propylene carbonate; water and so on. These may be used singly or two or more of them may be used in admixture.

The reaction is desirably carried out in the presence of a basic compound. As such basic compound, all specifically mentioned hereinabove can adequately be used. For accelerating the reaction, any of the phase transfer catalysts known in the art may be added to the reaction system. As examples of the phase transfer catalyst, there may be mentioned quaternary ammonium salts and crown ethers, among others.

The vinyl polymer having a group represented by the general formula (1) as produced according to the invention can be made into an epoxy resin composition and this constitutes one aspect of the invention.

This composition generally comprises the following two components: the vinyl polymer having a group represented by the general formula (1) at a main chain terminus and an epoxy resin curing agent.

The vinyl polymer may comprise a single species or a mixture of two or more species.

The epoxy resin curing agent is not particularly restricted but use may be made of such photo- or ultraviolet-curing agents as aliphatic amines, alicyclic amines, aromatic amines; acid anhydrides; polyamides; imidazoles; amineimides; urea; melamine and derivatives thereof; polyamine salts; phenol resins; polymercaptans, polysulfides; aromatic diazonium salts; diallyliodonium salts, triallylsulfonium salts, triallylselenium salts and the like.

Further, an epoxy resin known in the art may be used in combination with the vinyl polymer of the invention. Such epoxy resin is not particularly restricted but includes, but is not limited to, glycidyl ether type epoxy resins derived from bisphenol A, bisphenol F or tetrabromobisphenol A, novolak type epoxy resins, hydrogenated bisphenol A-based epoxy resins, glycidyl ether type epoxy resins derived from bisphenol A-propylene oxide adducts, p-hydroxybenzoic acid glycidyl ether ester type epoxy resins, m-aminophenol-based epoxy resins, diaminodiphenylmethane-based epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ethers, glycidyl ethers of polyhydric alcohols such as glycerol, hydantoin type epoxy resins, epoxidization products from unsaturated polymers such as petroleum resins and the like. These epoxy resins may be used singly or two or more of them may be used in admixture.

For improving the mechanical/physical properties or cured products, various fillers may be incorporated. Usable as the fillers are reinforcing fillers such as fumed silica, precipitated silica, silicic anhydride, hydrous silicic acid and carbon black; such fillers as calcium carbonate, magnesium carbonate, diatomaceous earth, calcined clay, clay, talc, titanium oxide, bentonite, organic bentonite, ferric oxide, zinc oxide, activated zinc white and sirasu balloons; and fibrous fillers such as asbestos, and glass fibers and filaments; For obtaining cured products having high strength using these fillers, a filler selected mainly from among fumed silica, precipitated silica, silicic anhydride, hydrous silicic acid, carbon black, surface-treated, finely divided calcium carbonate, calcined clay, clay, activated zinc white and the like is used in an amount within the range of 1 to 100 parts by weight per 100 parts by weight of the (meth)acrylic polymer, whereupon favorable results can be obtained. For obtaining cured products low in strength but high in elongation, a filler selected mainly from among titanium oxide, calcium carbonate, talc, ferric oxide, zinc oxide and sirasu balloons is used in an amount within the range of 5 to 200 parts by weight per 100 parts of the (meth)acrylic polymer to give favorable results. These fillers may be used singly or two or more of them may be used in admixture.

It is also possible to use various plasticizers, coupling agents, mold release agents and so forth.

Now, the second aspect of the invention is explained.

The second aspect of the invention lies in an epoxy resin composition comprising two components, namely (A) an epoxy resin and (B) a vinyl polymer having a main chain produced by living radical polymerization and a reactive functional group at a main chain terminus.

The component (A) epoxy resin according to the second aspect of the invention is not particularly restricted but includes various ones. Examples include, but are not limited to glycidyl ether type epoxy resins derived from bisphenol A, bisphenol F, tetrabromobisphenol A or the like, novolak type epoxy resins, hydrogenated bisphenol A-based epoxy resins, glycidyl ether type epoxy resins derived from bisphenol A-propylene oxide adducts, p-hydroxybenzoic acid glycidyl ether ester type epoxy resins, m-aminophenol-based epoxy resins, diaminodiphenylmethane-based epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ethers, glycidyl ethers of polyhydric alcohols such as glycerol, hydantoin type epoxy resins, epoxidation products derived from unsaturated polymers such as petroleum resins, and the like. These epoxy resins may be used singly or two or more of them may be used in admixture.

The reactive functional group according to the second aspect of the invention is not particularly restricted but may be any functional group capable of reacting with the epoxy group of the epoxy resin to thereby effect crosslinking. As examples, there may be mentioned an alcoholic hydroxyl group, a phenolic hydroxyl group, an amino group, an amide group and a carboxyl group.

The vinyl type monomer constituting the main chain of the vinyl polymer in the second aspect of the invention is not particularly restricted but may be any of those mentioned hereinabove referring to the first aspect of the invention.

The molecular weight distribution of the above vinyl polymer is not particularly restricted but, generally, the ratio (Mw/Mn) of weight average molecular weight (Mw) to number average molecular weight (Mn) as determined by gel permeation chromatography is less than 1.8, preferably not more than 1.7, more preferably not more than 1.6, still more preferably not more than 1.5, especially preferably not more than 1.4, most preferably not more than 1.3. In the practice of the invention, GPC measurements are generally carried out using polystyrene gel columns with chloroform as the mobile phase and the number average molecular weight and so on can be determined on the polystyrene equivalent basis.

The number average molecular weight of the vinyl polymer in the practice of the second aspect of the invention is not particularly restricted but preferably is within the range of 500 to 1,000,000, more preferably 1,000 to 100,000.

The vinyl polymer having a reactive functional group which is to be used in the practice of the second aspect of the invention may be any polymer terminally having a reactive functional group. In view of the ease of control of the molecular weight, molecular weight distribution and of terminal functional group introduction, however, the abovementioned living radical polymerization method is preferably employed as the method of producing the main chain of the vinyl polymer.

For producing the vinyl polymer having a reactive functional group by using the living radical polymerization, a process comprising the following steps, for instance, may be mentioned:

(1) Forming a vinyl polymer by polymerizing a vinyl monomer(s) by the living radical polymerization technique and (2) Reacting, at the end point of the polymerization, the polymer with a compound having both a reactive functional group and an ethylenically unsaturated group.

The compound having both an ethylenically unsaturated group and a reactive functional group is not particularly restricted but includes, among others, hydroxy-containing vinyl monomers such as 2-hydroxyethyl (meth)acrylate and 2-hydroxypropyl (meth)acrylate; amido-containing vinyl monomers such as (meth)acrylamide; amino-containing vinyl monomers such as 2-aminoethyl (meth)acrylate; carboxyl-containing vinyl monomers such as (meth)acrylic acid, maleic acid, maleic acid monoalkyl esters, fumaric acid and fumaric acid monoalkyl esters, and the like.

Further, maleic anhydride; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; tert-butoxystyrene; acetoxystyrene; and the like may also be used.

Further, phenols having an ethylenically unsaturated group, such as o-, m- and p-allylphenol and o-, m- and p-allyloxyphenol; alcohols having an ethylenically unsaturated group, such as allyl alcohol, butenyl alcohol, pentenyl alcohol and hexenyl alcohol; amines having an ethylenically unsaturated group, such as allylamine, butenylamine, pentenylamine and hexenylamine; carboxylic acid compounds having an ethylenically unsaturated group, such as vinyl acetate, pentenoic acid, heptenoic acid and undecenoic acid; and the like may also be used.

When the compound having both an ethylenically unsaturated group and a reactive functional group is reacted with the polymer terminus, the compound as such may be subjected to reaction. In some cases, however, the reactive functional group may affect the polymer terminus and, in such cases, it may be used in the form having a protective group. As the protective group, there may be mentioned acetyl, silyl groups and alkoxy groups, among others. Suited for use as the compound having a protective group are all the compounds mentioned above whose functional group is protected.

The compound having both a reactive functional group and an ethylenically unsaturated group may be subjected to reaction with the polymer isolated after completion of the vinyl monomer polymerization by newly adding that compound to that polymer together with a catalyst or may be added and subjected to reaction in the course of polymerization (in situ). In the latter case, the monomer conversion of the first polymerization should be as high as possible, preferably not less than 80%. If the conversion is not more than 80%, the reactive functional group is distributed on side chains, not at molecular termini, whereby the mechanical characteristics of cured products will be impaired. In principle, the addition of such compound having a reactive functional group and an ethylenically unsaturated group in an equivalent amount relative to the whole number of termini results in introduction of the functional group at all termini. For securing the introduction of the functional group at all termini, however, it is recommendable to use the compound in excess, specifically in an amount of 1 to 5 times excess relative to the number of termini. When it is used in an amount not less than 5 times, the functional group is introduced terminally into the polymer at an excessively high density and this is unfavorable from the cured product physical properties viewpoint.

The vinyl polymer having a reactive functional group according to the invention may also be produced by the following steps:

(1) Producing a vinyl polymer terminally having a halogen, and
(2) Converting the halogen at the polymer terminus to a substituent having a reactive functional group.

A chlorine, bromine or iodine atom is preferred as the halogen. As the method of producing the halogen-terminated vinyl polymer, there may be mentioned the radical polymerization method using a halide compound as a chain transfer agent and the above-mentioned atom transfer radical polymerization. In view of the ease of control of the molecular weight and molecular weight distribution, the latter is preferred. The initiators, catalysts, solvents, polymerization conditions and so forth as already mentioned hereinabove specifically for atom transfer radical polymerization all can adequately be used.

As the method of converting the halogen at a polymer terminus, there may be mentioned, for example, the nucleophilic substitution reaction using a nucleophilic reagent having a reactive functional group. As such nucleophilic reagent, there may be mentioned, among others, alcohols, phenols, carboxylic acids and amines each having a reactive functional group, and alkali metal salts or ammonium salts thereof. Carbanions having a reactive functional group and stabilized by an electron-attracting substituent are also suited for use. Specific examples of the nucleophilic reagent are shown below.

As the alcohols having a reactive function group, there maybe mentioned, among others, aliphatic diols such as ethylene glycol; alicyclic diols such as 1,2-cyclopentanediol, 1,3-cyclopentanediol, 1,2-cyclohexanediol, 1,3-cyclohexanediol and 1,4-cyclohexanediol; amino-containing alcohols such as ethanolamine; and the like.

As the phenols having a reactive function group, there may be mentioned, among others, compounds having two phenolic hydroxyl groups in each molecule, such as hydroquinone, catechol, resorcinol, bisphenol A and biphenol; and the like.

As the carboxylic acids having a reactive function group, there may be mentioned, among others, hydroxyl-containing carboxylic acid compounds such as HO—$(CH_2)_n$—$CO_2H$ (n being an integer of 0 to 10); carboxylic acid compounds having a phenolic hydroxyl group, such as hydroxybenzoic acid and 4'-hydroxy-4-biphenylcarboxylic acid; amino acid compounds; dibasic carboxylic acids such as oxalic acid, malonic acid, succinic acid, glutaric acid, adipic acid, $HO_2C$—$(CH_2)_n$—$CO_2H$ (n being an integer of 5 to 20), 1,2-cyclopentanedicarboxylic acid, 1,2-cyclohexanedicarboxylic acid, 1,3-cyclohexanedicarboxylic acid, 1,4-cyclohexanedicarboxylic acid, maleic acid, fumaric acid, malic acid, tartaric acid, phthalic acid, isophthalic acid, terephthalic acid and naphthalenedicarboxylic acids; halides of the dibasic carboxylic acids mentioned above; cyclic acid anhydrides such as succinic anhydride, maleic anhydride and phthalic anhydride; and the like.

As the amines having a reactive function group, there may be mentioned, among others, aliphatic amines, alicyclic amines and aromatic amines each having a reactive functional group.

Alkali metal salts and ammonium salts of the above-mentioned various nucleophilic reagents may also be used as nucleophilic reagents. The alkali metal salts and ammonium salts are obtained by reacting the above nucleophilic reagents with a basic compound. The basic compound is not particularly restricted but includes, among others, alkali metals such as potassium, sodium and lithium; metal alkoxides such as sodium methoxide, potassium methoxide, lithium methoxide, sodium ethoxide, potassium ethoxide, lithium ethoxide, sodium tert-butoxide and potassium tert-butoxide; carbonates such as sodium carbonate, potassium carbonate, lithium carbonate and sodium hydrogen carbonate; hydroxides such as sodium hydroxide and potassium hydroxide; hydrides such as sodium hydride and potassium hydride; organolithium compounds such as methyllithium, ethyllithium, n-butyllithium, tert-butyllithium, lithium diisopropylamide and lithium hexamethyldisilazide; ammonium, amines such as trimethylamine, triethylamine, tributylamine, tetramethylethylenediamine and pentamethyldiethylenetriamine; pyridine compounds such as pyridine and picoline; and the like.

Quaternary ammonium salts may also be used as the nucleophilic reagent. The quaternary ammonium salts can be prepared by reacting the alkali metal salts mentioned above with a quaternary ammonium halide. The quaternary ammonium halide is not particularly restricted but includes, among others, tetramethylammonium halides, tetraethylammonium halides, trimethylbenzylammonium halides, trimethyldodecylammonium halides and tetrabutylammonium halides.

As the solvent to be used in the nucleophilic substitution reaction, there may be mentioned, among others, hydrocarbon solvents such as benzene, toluene and xylene; halogenated hydrocarbon solvents such as methylene chloride, chloroform and chlorobenzene; ether solvents such as diethyl ether, dioxane, tetrahydrofuran, diphenyl ether, anisole and dimethoxybenzene; ester solvents such as ethyl acetate and butyl acetate; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; amide solvents such as dimethylformamide, dimethylacetamide and hexamethylphosphoric triamide; sulfoxide solvents such as dimethyl sulfoxide; carbonate solvents such as ethylene carbonate and propylene carbonate; water and so on. These may be used singly or two or more of them may be used in admixture. The substitution reaction can be carried out at 0 to 150° C.

For promoting the substitution reaction, a basic compound may be added to the reaction system. All the bases already specifically mentioned hereinabove may adequately be used as the base.

A phase transfer catalyst such as a quaternary ammonium halide and crown ether may also be added to the reaction system for promoting the substitution reaction.

As already mentioned hereinabove, a vinyl polymer having a functional group at both termini can be produced also By polymerizing vinyl monomers using an initiator having a reactive functional group, followed by coupling of a polymer terminus with another. As the method of coupling, there may be mentioned, for example, a method which comprises coupling terminal halogens with each other using a compound having a total of two or more functional groups which may be the same or different and each can substitute the polymer terminal halogen.

The compound having a total of two or more functional groups which maybe the same or different and each can substitute the polymer terminal halogen is not particularly restricted but preferably is a polyol, polyamine, polycarboxylic acid or polythiol, or a salt thereof, an alkali metal sulfide or the like. Specific examples of these compounds are as follows:

Polyols such as ethylene glycol, 1,2-propanediol, 1,3-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,5-pentanediol, 1,4-pentanediol, 2,4-pentanediol, 1,6-hexanediol, 1,7-heptanediol, 1,8-octanediol, 1,9-nonanediol, 1,10-decanediol, 1,12-dodecanediol, 1,2-cyclopentanediol, 1,3-cyclopentanediol, 1,2-cyclohexanediol, 1,3-cyclohexanediol, 1,4-cyclohexanediol, glycerol, 1,2,4-butanetriol, catechol, resorcinol, hydroquinone, 1,2-dihydroxynaphthalene, 1,3-dihydroxynaphthalene, 1,5-dihydroxynaphthalene, 2,6-dihydroxynaphthalene, 2,2'-biphenol, 4,4'-biphenol, bis(4-hydroxyphenyl)methane, 4,4'-isopropylidenephenol, 3,3'-(ethylenedioxy)diphenol, $\alpha,\alpha'$-dihydroxy-p-xylene, 1,1,1-tris(4-hydroxyphenyl)ethane, pyrogallol and 1,2,4-benzenetriol; and alkali metal salts of the above polyol compounds;

Polyamines such as ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-diaminononane, 1,10-diaminodecane, 1,12-diaminododecane, 4,4'-methylenebis(cyclohexylamine), 1,2-diaminocyclohexane, 1,3-diaminocyclohexane, 1,4-diaminocyclohexane, 1,2-phenylenediamine, 1,3-phenylenediamine, 1,4-phenylenediamine and $\alpha,\alpha'$-diamino-p-xylene; and alkali metal salts of the above polyamines;

Polycarboxylic acids such as oxalic acid, malonic acid, methylmalonic acid, dimethylmalonic acid, succinic acid, methylsuccinic acid, glutaric acid, adipic acid, 1,7-heptanedicarboxylic acid, 1,8-octanedicarboxylic acid, 1,9-nonanedicarboxylic acid, 1,10-decanedicarboxylic acid, 1,11-undecanedicarboxylic acid, 1,12-dodecanedicarboxylic acid, 1,2-cyclopentanedicarboxylic acid, 1,2-cyclohexanedicarboxylic acid, 1,3-cyclohexanedicarboxylic acid, 1,4-cyclohexanedicarboxylic acid, 1,3,5-cyclohexanetricarboxylic acid, phthalic acid, isophthalic acid, terephthalic acid, 1,2,3-benzenetricarboxylic acid and 1,2,4,5-benzenetetracarboxylic acid; and alkali metal salts of the above polycarboxilic acids;

Polythiols such as 1,2-ethanedithiol, 1,3-propanedithiol, 1,4-butanedithiol, 2,3-butanedithiol, 1,5-pentanedithiol, 1,6-hexanedithiol, 1,7-heptanedithiol, 1,8,-octanedithiol, 1,9-nonanedithiol, 2-mercaptoethyl ether, p-xylene-$\alpha,\alpha'$-dithiol, 1,2-benzenedithiol, 1,3-benzenedithiol and 1,4-benzenedithiol; and alkali metal salts of the above polythiol compounds;

Lithium sulfide, sodium sulfide and potassium sulfide; and so forth.

For promoting the reaction, a basic compound may also be added to the reaction system. As the base to be used, those already specifically mentioned hereinabove all are suited for use.

For promoting the reaction, a phase transfer catalyst such as a quaternary ammonium halide and crown ether may also be added to the reaction system.

The epoxy resin composition according to the second aspect of the invention comprises, as essential components, the epoxy resin, namely the above-mentioned (A) component, and the vinyl polymer terminally having a reactive functional group, namely the above-mentioned (B) component. The mixing ratio between the both components is generally such that the vinyl polymer accounts for 0.1 to 1,000 parts by weight, preferably 1 to 500 parts by weight, more preferably 1 to 200 parts by weight, per 100 parts by weight of the epoxy resin. At an addition amount below 0.1 part by weight, the effects of incorporation are not fully produced. At an amount above 1,000 parts by weight, the rate of curing unfavorably falls.

The invention also includes the combined use of an epoxy resin curing agent known in the art. As examples of such curing agent, there may be mentioned:

Primary amines such as diethylenetriamine, triethylenetetramine, tetraethylenepentamine, hexamethylenediamine, diethylaminopropylamine, N-aminoethylpiperazine, BASF's Lamilon C-260, CIBA's Araldite HY-964, Rohm and Haas' Menthenediamine, isophoronediamine, diaminodicyclohexylmethane, m-xylylenediamine, m-phenylenediamine, diaminodiphenylmethane and diaminodiphenyl sulfone, straight-chain diamines represented by $(CH_3)_2N(CH_2)_nN(CH_3)_2$ (n being an integer of 1 to 10), straight-chain tertiary amines represented by $(CH_3)_2N(CH_2)_nCH_3$ (n being an integer of 0 to 10), tetramethylguanidine, alkyl-tertiary monoamines represented by $N[(CH_2)_nCH_3]_3$ (n being an integer of 1 to 10), triethanolamine, piperidine, N,N'-dimethylpiperazine, triethylenediamine, pyridine, picoline, diazabicycloundecene, benzyldimethylamine, 2-(dimethylaminomethyl)phenol, 2,4,6-tris (dimethylaminomethyl)phenol and like secondary or tertiary amines, acid anhydrides such as phthalic anhydride, trimellitic anhydride and benzophenonetetracarboxylic anhydride, various polyamide resins, dicyandiamide and derivatives thereof, various imidazoles, and the like.

For improving the mechanical/physical properties of cured products, various fillers may be incorporated. Usable as the fillers are reinforcing fillers such as fumed silica, precipitated silica, silicic anhydride, hydrous silicic acid and carbon black; such fillers as calcium carbonate, magnesium carbonate, diatomaceous earth, calcined clay, clay, talc, titanium oxide, bentonite, organic bentonite, ferric oxide, zinc oxide, activated zinc white and sirasu balloons; and fibrous fillers such as asbestos, and glass fibers and filaments. For obtaining cured products having high strength using these fillers, a filler selected mainly from among fumed silica, precipitated silica, silicic anhydride, hydrous silicic acid, carbon black, surface-treated, finely divided calcium carbonate, calcined clay, clay, activated zinc white and the like is used in an amount within the range of 1 to 100 parts by weight per 100 parts by weight of the (meth)acrylic polymer, whereupon favorable results can be obtained. For obtaining cured products low in strength but high in elongation, a filler selected mainly from among titanium oxide, calcium carbonate, talc, ferric oxide, zinc oxide and sirasu balloons is used in an amount within the range of 5 to 200 parts by weight per 100 parts of the (meth)acrylic polymer to give favorable results. These fillers may be used singly or two or more of them may be used in admixture.

It is also possible to use various plasticizers, coupling agents, mold release agents and so forth.

As specific uses of the composition of the present invention, there may be mentioned, among others, sealing materials, adhesives, pressure sensitive adhesives, elastic adhesives, coating compositions, powder coating compositions, foamed or expanded articles, potting agents for electric and electronic use, films, molding materials and artificial marble.

BEST MODES FOR CARRYING OUT THE INVENTION

In the following, some specific examples of the present invention are described together with a comparative example. They are, however, by no means limitative of the scope of the invention. In the examples, the "number average molecular weight" and "molecular weight distribution (ratio between weight average molecular weight and number average molecular weight)" were determined by the standard polystyrene equivalent method using gel permeation chromatography (GPC). Columns packed with crosslinked polystyrene gels were used as GPC columns and chloroform was used as the GPC solvent.

PRODUCTION EXAMPLE 1

Synthesis of Br-terminated Poly(Butyl Acrylate)

A 10-liter separable flask equipped with a reflux condenser and a stirrer was charged with CuBr (28.0 g, 0.20 mol) and the reactor inside was purged with nitrogen. Acetonitrile (559 mL) was added, and the contents were stirred on an oil bath at 70° C. for 40 minutes. Thereto were added butyl acrylate (1.00 kg), diethyl 2,5-dibromoadipate (117 g, 0.325 mol) and pentamethyldiethylenetriamine (hereinafter, "triamine"; 1.7 mL, 1.4 g, 8.1 mmol) to thereby start the reaction. While heating at 70° C. with stirring, butyl acrylate (4.00 kg) was added dropwise continuously. During dropping of butyl acrylate, the triamine (8.5 mL, 7.06 g, 0.041 mol) was further added.

The reaction mixture was diluted with toluene and passed through an activated alumina column, and the volatile matter was then distilled off under reduced pressure to give a Br-terminated polymer (polymer [1]). The polymer [1] had a number average molecular weight of 19,500 and a molecular weight distribution of 1.17.

EXAMPLE 1

Synthesis of a Phenol Group-terminated poly(butyl acrylate)

A 100-ml reaction vessel was charged with the polymer [1] (50 g) obtained in Production Example 1, potassium p-hydroxybenzoate (1.96 g, 11.1 mmol) and dimethylacetamide (50 mL). The contents were heated at 70° C. with stirring for 3 hours under a stream of nitrogen. The reaction mixture was diluted with toluene and passed through an activated alumina column, and the volatile matter was then distilled off under reduced pressure. The polymer obtained was dissolved in toluene and the solution was again passed through an activated alumina column, and the toluene was distilled off under reduced pressure to give phenol-terminated poly(butyl acrylate) (polymer [2]). The average number of phenol groups introduced per molecule of the polymer was determined to be 2.3 by $^1$H NMR spectrometry.

EXAMPLE 2

Synthesis of an Epoxy-terminated Poly(Butyl Acrylate)

A 50-mL two-necked flask equipped with a reflux condenser was charged with the polymer [2] (5.0 g) obtained in Production Example 2, tert-butoxypotassium (0.070 mg) and dimethylacetamide (10 mL), and the contents were heated at 70° C. with stirring. Epichlorohydrin (2.5 mL) was added, and the mixture was heated at 70° C. with stirring for 1 hour. The reaction mixture was diluted with toluene and passed through an activated alumina column, and the volatile matter was then distilled off under reduced pressure. The polymer obtained was dissolved in toluene and the solution was again passed through an activated alumina column, and the toluene was distilled off under reduced pressure to give a polymer [3].

Upon analysis of the polymer [3] by $^1$H NMR spectrometry, an epoxy group-due peak was observed at around 2.9 ppm, indicating that the epoxy group introduction into the polymer had been accomplished.

EXAMPLE 3

Modification of an Epoxy Resin

A bisphenol A-based liquid epoxy resin (2.0 g; Epikote 825, product of Yuka Shell Epoxy Kabushiki Kaisha), the polymer [2] (2.0 g) obtained in Example 1 and a tertiary amine (0.080 g; Epicure 3010, product of Yuka Shell Epoxy Kabushiki Kaisha) were thoroughly mixed up and the mixture was heated at 150° C. for 1 hour to give a cured product. The cured product had flexibility. The uncured fraction of the cured product was extracted with toluene and the gel fraction of the cured product was determined based on the weight ratio between the weight of the cured product before extraction and that after extraction and found to be 91%.

INDUSTRIAL APPLICABILITY

The terminally reactive vinyl polymer and epoxy resin composition of the invention can improve the hard and brittle characteristics of epoxy resins and provide them flexibility, without impairing the favorable characteristics of the epoxy resins, such as the bond properties.

What is claimed is:

1. An epoxy resin composition which comprises a vinyl polymer having a group represented by the following general formula (1) at a main chain terminus thereof:

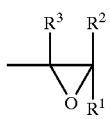

(1)

wherein, $R^1$, $R^2$ and $R^3$ are the same or different and each represents a hydrogen atom, a monovalent hydrocarbon group containing 1 to 10 carbon atoms or a monovalent group containing 1 to 10 carbon atoms as derived from two hydrocarbon groups by being bound together via an ether bond or ester bond, and $R^1$ and $R^2$ or $R^2$ and $R^3$ may be combined together at respective other termini to form a cyclic structure;

wherein the vinyl polymer having a group represented by the general formula (1) at a main chain terminus thereof is obtained by reacting a reactive functional group of a vinyl polymer having the reactive functional group at a main chain terminus thereof with a compound represented by the following general formula (2):

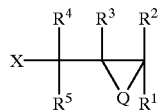

(2)

wherein $R^1$, $R^2$ and $R^3$ are defined as above, $R^4$ and $R^5$ are the same or different and each represents a hydrogen atom, a monovalent hydrocarbon group containing 1 to 10 carbon atoms or a monovalent group containing 1 to 10 carbon atoms as derived from two hydrocarbon groups by being bound together via an ether bond or ester bond and X represents a chlorine, bromine or iodine atom; and wherein the reactive functional group is a phenolic hydroxyl group.

2. The epoxy resin composition according to claim 1, wherein a main chain of the vinyl polymer is obtained polymerization of a (meth)acrylic monomer.

3. The epoxy resin composition according to claim 2, wherein the (meth)acrylic monomer is a (meth)acrylic acid ester monomer.

4. The epoxy resin composition according to claim 3, wherein the (math)acrylic acid ester monomer is an acrylic acid ester monomer.

5. The epoxy resin composition according to claim 1, wherein a main chain of the vinyl polymer is obtained by polymerization of a styrenic monomer.

6. The epoxy resin composition according to claim 1, wherein the vinyl polymer has a ratio (Mw/Mn) between weight average molecular weight (Mw) and number average molecular weight (Mn) of less than 1.8 as determined by gel permeation chromatography.

7. The epoxy resin composition according to claim 1, wherein the vinyl polymer has a number average molecular weight within the range of 1,000 to 100,000.

8. The epoxy resin composition according to claim 1, wherein the vinyl polymer having a reactive functional group at a main chain terminus thereof is obtained by (1) carrying out polymerization of a vinyl monomer by the living radical polymerization technique and (2) reacting, at the end point of the polymerization, the resulting polymer with a compound having both a reactive functional group and an ethylenically unsaturated group.

9. The epoxy resin composition according to claim 8, wherein the living radical polymerization is carried out in the manner of atom transfer radical polymerization.

10. The epoxy resin composition according to claim 1, wherein the vinyl polymer having a reactive functional group at a main chain terminus thereof is obtained by (1) producing a vinyl polymer having a halogen atom at a main chain terminus thereof by atom transfer radical polymerization and (2) converting said halogen atom to a substituent having a reactive functional group.

11. The epoxy resin composition according to claim 1, wherein the vinyl polymer having a reactive functional group at a main chain terminus thereof is obtained by radical polymerization of a vinyl monomer using a chain transfer agent.

12. A vinyl polymer having a group represented by the following general formula (1) at a main chain terminus thereof:

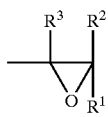

(1)

wherein, $R^1$, $R^2$ and $R^3$ are the same or different and each represents a hydrogen atom, a monovalent hydrocarbon group containing 1 to 10 carbon atoms or a monovalent group containing 1 to 10 carbon atoms as derived from two hydrocarbon groups by being bound together via an ether bond or ester bond, and $R^1$ and $R^2$ or $R^2$ and $R^3$ may be combined together at respective other termini to form a cyclic structure;

which polymer is obtained by reacting a reactive functional group of a vinyl polymer having the reactive functional group at a main chain terminus thereof with a compound represented by the following general formula (2):

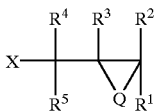

(2)

wherein $R^1$, $R^2$ and $R^3$ are defined as above, $R^4$ and $R^5$ are the same or different and each represents a hydrogen atom, a monovalent hydrocarbon group containing 1 to 10 carbon atoms or a monovalent group containing 1 to 10 carbon atoms as derived from two hydrocarbon groups by being bound together via an ether bond or ester bond and X represents a chlorine, bromine or iodine atom, wherein the reactive functional group is selected from a phenolic hydroxyl group.

13. The vinyl polymer according to claim 12, wherein the main chain thereof is obtained by polymerization of a (meth)acrylic monomer.

14. The vinyl polymer according to claim 13, wherein the (meth)acrylic monomer is a (meth) acrylic acid ester monomer.

15. The vinylpolymer according to claim 14, wherein the (meth)acrylic acid ester monomer is an acrylic acid ester monomer.

16. The vinyl polymer according to claim 12, wherein the main chain thereof is obtained by polymerization of a styrenic monomer.

17. The vinyl polymer according to claim 12 which has a ratio (Mw/Mn) between weight average molecular weight (Mw) and number average molecular weight (Mn) of less than 1.8 as determined by gel permeation chromatography.

18. The vinyl polymer according to claim 12 which has a number average molecular weight within the range of 1,000 to 100,000.

19. The vinyl polymer according to claim 12, wherein the vinyl polymer having a reactive functional group at a main chain terminus thereof is obtained by (1) carrying out polymerization of a vinyl monomer by the living radical polymerization technique and (2) reacting, at the end point of the polymerization, the resulting polymer with a compound having both a reactive functional group and an ethylenically unsaturated group.

20. The epoxy resin composition according to claim 19, wherein the living radical polymerization is carried out in the manner of atom transfer radical polymerization.

21. The vinyl polymer according to claim 12, wherein the vinyl polymer having a reactive functional group at a main chain terminus thereof is obtained by (1) producing a vinyl polymer having a halogen atom at a main chain terminus thereof by atom transfer radical polymerization and (2) converting said halogen atom to a substituent having a reactive functional group.

22. The vinyl polymer according to claim 12, wherein the vinyl polymer having a reactive functional group at a main chain terminus thereof is obtained by radical polymerization of a vinyl monomer using a chain transfer agent.

* * * * *